(12) United States Patent
Goto

(10) Patent No.: US 7,734,318 B2
(45) Date of Patent: Jun. 8, 2010

(54) FOLDABLE PORTABLE INFORMATION PROCESSING DEVICE FOR DISPLAYING PLURAL IMAGES

(75) Inventor: Yoshihiro Goto, Hamura (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1012 days.

(21) Appl. No.: 11/213,006

(22) Filed: Aug. 26, 2005

(65) Prior Publication Data

US 2006/0058079 A1    Mar. 16, 2006

(30) Foreign Application Priority Data

Sep. 16, 2004    (JP) ............... 2004-269941

(51) Int. Cl.
  *H04M 1/00*    (2006.01)
(52) U.S. Cl. ............ 455/575.3; 455/550.1; 455/566
(58) Field of Classification Search .......... 455/550.1, 455/566, 574, 575.1, 575.3, 575.8, 90.3; 379/433.04, 433.13
See application file for complete search history.

(56) References Cited

U.S. PATENT DOCUMENTS

| | | | |
|---|---|---|---|
| 5,805,981 A | 9/1998 | Sugio et al. | |
| 6,233,467 B1 * | 5/2001 | Rydbeck | 455/566 |
| 6,434,370 B1 | 8/2002 | Kodera et al. | |
| 6,879,842 B2 * | 4/2005 | King et al. | 455/550.1 |
| 6,982,728 B1 * | 1/2006 | Nicolas et al. | 345/649 |
| 6,987,988 B2 * | 1/2006 | Uchiyama | 455/557 |
| 7,174,195 B2 * | 2/2007 | Nagamine | 455/575.1 |
| 2001/0004269 A1 * | 6/2001 | Shibata et al. | 348/333.06 |
| 2002/0051060 A1 * | 5/2002 | Wada | 348/207 |
| 2003/0203731 A1 * | 10/2003 | King et al. | 455/407 |
| 2004/0185878 A1 | 9/2004 | Woo | |
| 2005/0119032 A1 * | 6/2005 | Airas | 455/566 |

FOREIGN PATENT DOCUMENTS

| | | |
|---|---|---|
| CN | 1122556 A | 5/1996 |
| CN | 1267990 | 9/2000 |
| JP | 11-313229 | 11/1999 |
| JP | 2000-333046 | 11/2000 |
| JP | 2003-249986 | 9/2003 |
| JP | 2003-309634 | 10/2003 |

(Continued)

OTHER PUBLICATIONS

Office Action dated October 17, 2006 with an English-language translation issued by the Korean Patent Office for the corresponding Korean patent application.

*Primary Examiner*—Lana N Le
*Assistant Examiner*—Ping Y Hsieh
(74) *Attorney, Agent, or Firm*—Cohen Pontani Lieberman & Pavane LLP

(57) ABSTRACT

In the event that a cellular telephone is placed in a charging stand in an incoming wait status or if a predetermined time that the device has been left unattended elapses, a slide show display is executed which sequentially switches and displays a plurality of images in the main display portion but only when in the arrangement position of namely, view style, in a folded position with the main display portion facing outward. Additionally, when executing a slide show display, the slide direction is switched as the image size adjusts corresponding to the direction (portrait display position, landscape display position) of the main display portion.

5 Claims, 10 Drawing Sheets

FOREIGN PATENT DOCUMENTS

| | | |
|---|---|---|
| JP | 2003-316580 | 11/2003 |
| JP | 2004-080195 | 3/2004 |
| JP | 2004-214988 | 7/2004 |
| JP | 2004-242147 | 8/2004 |
| KR | 2002-0055892 | 7/2002 |

* cited by examiner

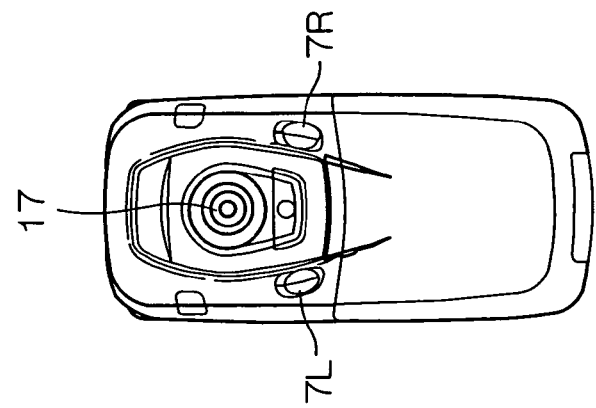
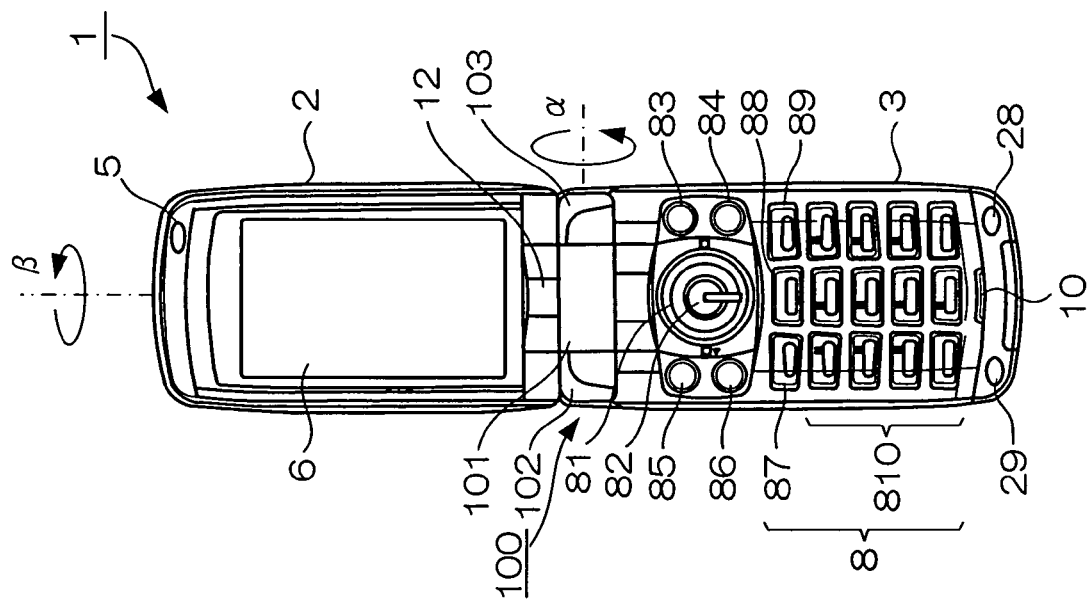
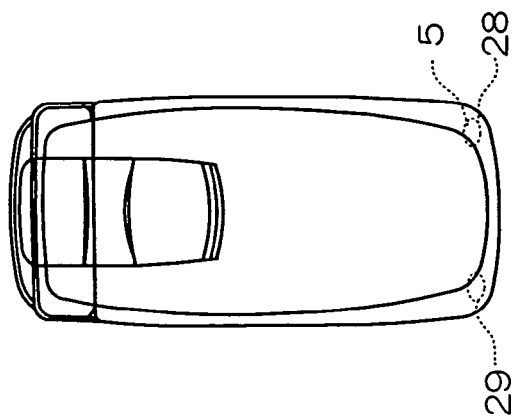

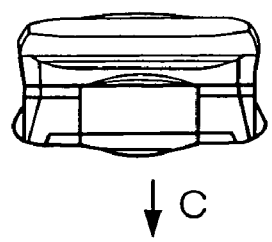
FIG. 2D
FIG. 2B
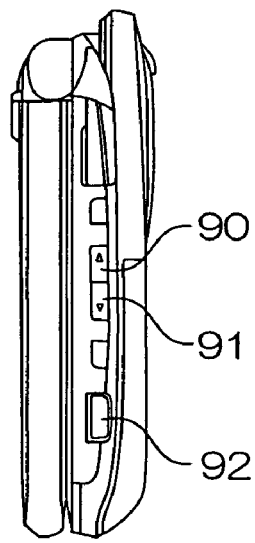
FIG. 2A
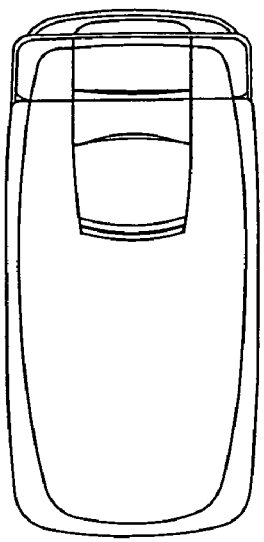
FIG. 2C
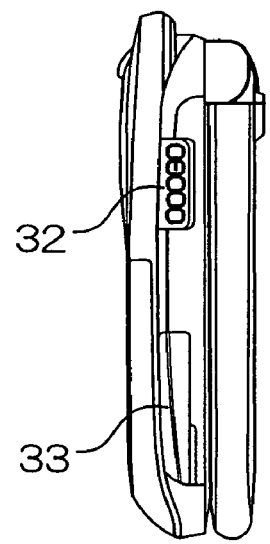
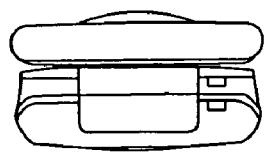
FIG. 2E

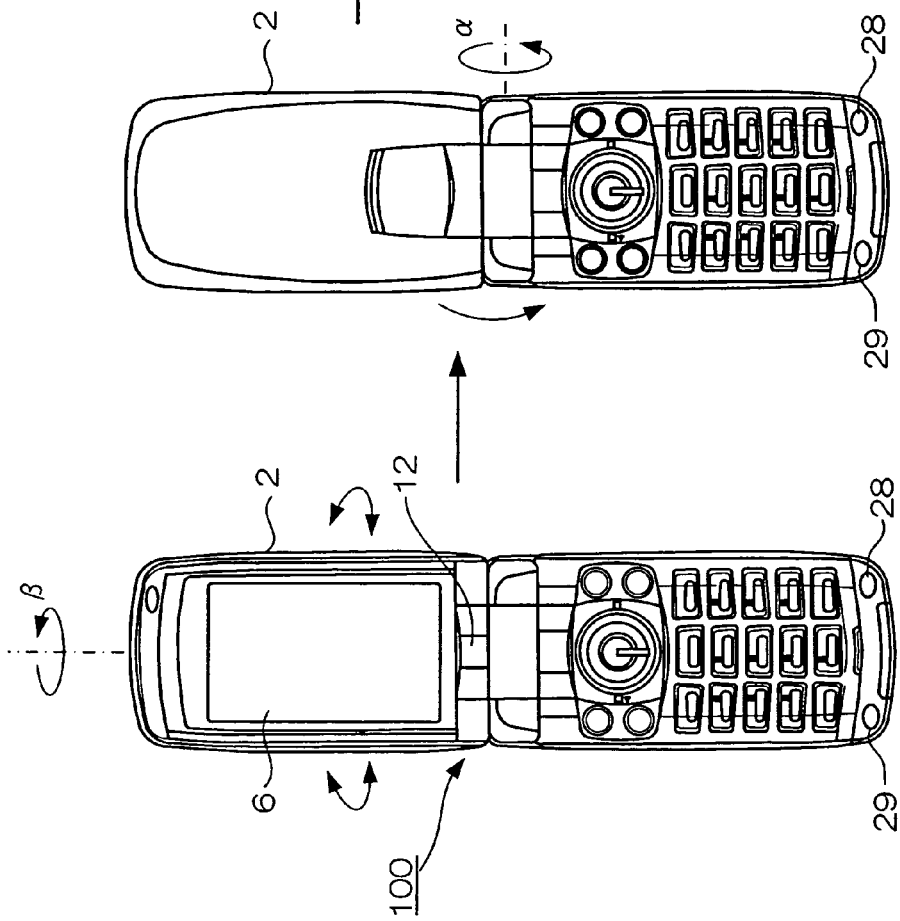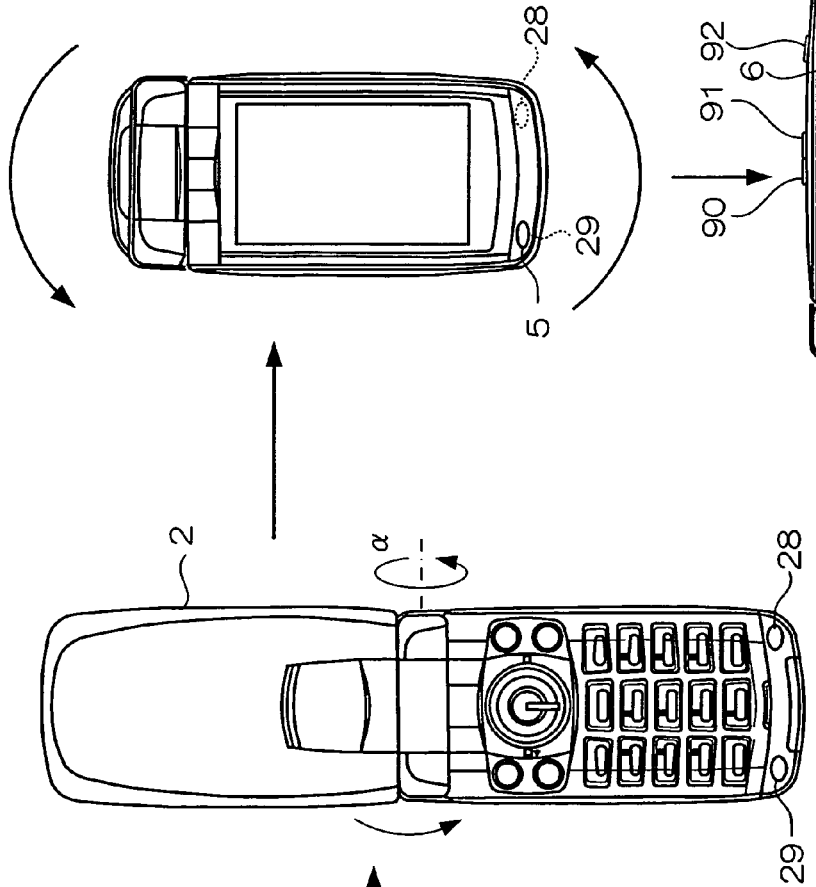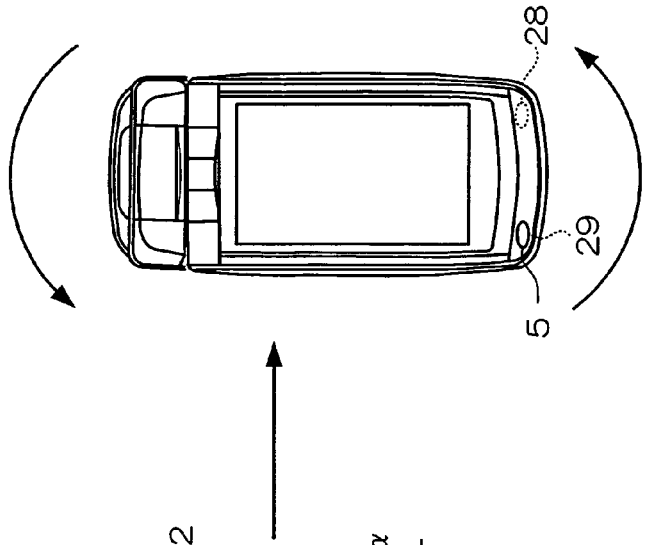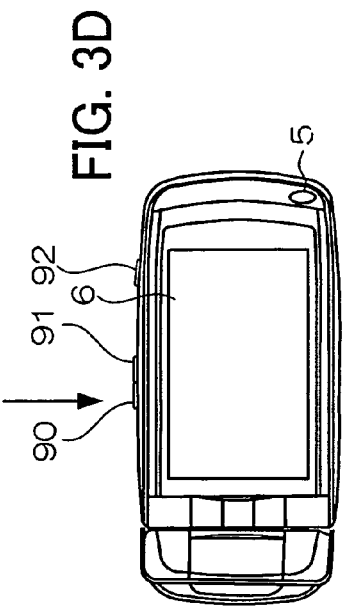

FOLDABLE PORTABLE INFORMATION PROCESSING DEVICE FOR DISPLAYING PLURAL IMAGES

CROSS-REFERENCE TO RELATED APPLICATION

This application is based upon and claims the benefit of priority from the prior Japanese Patent Application No. 2004-269941, filed Sep. 16, 2004, the entire contents of which is incorporated herein by reference.

BACKGROUND OF THE INVENTION

1. Field of the Invention

The present invention relates to a foldable portable information processing device and a slide display activation method for switching and displaying a plurality of images.

2. Description of the Related Art

Conventionally, in regard to digital cameras, etc., the technology for activating a slide show function and performing playback display of image data successively for a predetermined time interval using image data automatically recorded in the main display portion and by placing the display device in a charging stand has been proposed (for example, Japanese Laid-Open (Kokai) Patent Application No. 2000-333046 titled "INFORMATION REPRODUCTION DEVICE AND ITS CONTROL METHOD"). Additionally, the technology for activating a slide show function when driven by a commercial power source without being operated by the user has been proposed (for example, Japanese Laid-Open (Kokai) Patent Application No. H11-313229 (1999) titled "SCREEN SAVER FOR ELECTRONIC STILL CAMERA").

Apart from that, in recent years, foldable type cellular telephones comprise a playback function for still images and video recordings. The playback of these still images or video is performed in landscape or portrait style in the main display portion. However, the conventional prior art mentioned above in JP 2000-333046 and JP H11-313229 is based on the assumption of a digital camera. These disclosures do not envision a slide show function in a cellular telephone. Besides, there is no stated reference about a slide show function with respect to either the main display portion in a foldable type cellular telephone or the type of usage.

Specifically, this refers to a foldable type cellular telephone containing a cover part equipped with a main display portion and a main body part equipped with a key input portion which are joined by a two-axis rotation type hinge. Furthermore, a main display portion which accommodates various arrangement positions, such as a position in which the cover part (main display portion) is closed; a position in which the cover part is opened and the main display portion faces toward the user's side; a position in which the back surface of the cover part faces toward the user's side; and a position in which the main display portion faces toward the user's side although the cover part is closed against the main body side, which are suitable or unsuitable for a slide show display contingent upon that specific arrangement position. On the contrary, in the conventional prior art mentioned above in JP 2000-333046 and JP H11-313229, there is a matter of not being able to accommodate such diverse configurations.

SUMMARY OF THE INVENTION

The present invention has been made in view of the circumstances mentioned above. Accordingly, the objective of the present invention is to provide a foldable portable information processing device, a slide display activation method and a slide display activation program which can execute a slide show display in the most suitable position corresponding to the arrangement position of the device and prevent unnecessary execution of the slide show display in an unsuitable position.

To achieve the above-mentioned objective according to the present invention, a foldable portable information processing device including a first housing part having a key input portion and a second housing part having a main display portion, comprising a storage means for storing a plurality of images; a discrimination means for discriminating at which position from at least two available arrangement positions the first housing part and the second housing part are arranged relative to each other; and a display control means for sequentially switching among the plurality of images stored in the storage means and for correspondingly displaying the plurality of images on the main display portion upon a discrimination being made by the discrimination means that the second housing part is in a specific one of the arrangement positions of being folded against the first housing part in such a way that the main display portion faces outward.

Accordingly, the present invention has the advantages of being able to execute a slide show display in the most suitable position corresponding to the arrangement position of the device and being able to prevent unnecessary execution of the slide show display in an unsuitable arrangement position. These advantages are acquired because the display control means sequentially switches among the plurality of images stored by the storage means and correspondingly displays the plurality of images on the main display portion upon a discrimination being made by the discrimination means that the second housing part is in a specific one of the arrangement positions of being folded against the first housing part in such a way that the main display portion faces outward.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 1A~1C are outline view diagrams corresponding to the front surface view of the cover for a cellular telephone 1 in an opened position and in a closed position related to the preferred embodiments of the present invention;

FIGS. 2A~2E are outline view diagrams showing the front surface and each side surface of the cellular telephone 1 as well as the cover of the cellular telephone 1 in a closed position related to the preferred embodiments of the present invention;

FIGS. 3A~3D are mimetic diagrams showing use configurations as applied to the cellular telephone 1 according to the preferred embodiments;

DETAILED DESCRIPTION OF THE PREFERRED EMBODIMENTS

Figure 4A:
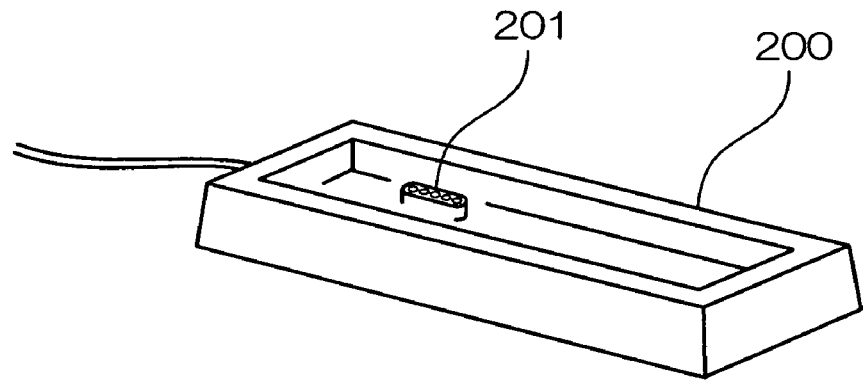
FIGS. 4A~4C are mimetic diagrams showing the process and position for placing the cellular telephone 1 in a charging stand (cradle) according to the preferred embodiments.

Hereinafter, the preferred embodiments of the present invention will be explained with reference to the drawings.

A. Composition of the Preferred Embodiments

FIGS. 1A~1C are outline view diagrams corresponding to the front surface view of the cover for a cellular telephone 1 in an opened position and in a closed position related to the preferred embodiments of the present invention. FIG. 1A shows the cover of the cellular telephone 1 in an opened position. FIG. 1B shows the cover of the cellular telephone 1 in a closed position (cover side). FIG. 1C shows the cover of the cellular telephone 1 in a closed position (back surface side).

As seen in these drawings, a cover part 2 is arranged with a first hinge portion 100 relative to a main body part 3 for opening and closing on a rotational axis (arrow a) and also a second hinge portion 12 being pivotable on a rotational axis (arrow β). The cover part 2 contains a first speaker 5, a main display portion 6 and a built-in antenna for data communication (not shown). The first speaker 5 is a dynamic speaker and arranged in the inner surface of the cover part 2. The main display portion 6 is arranged in the inner surface of the cover part 2 composed of a 2.7 inch (240×428 dots) TFT color liquid crystal display (comprising QVGA or HVGA resolution) with video displayed in a 16:9 aspect ratio.

The first hinge portion 100 configuration contains a moveable portion 101 which is joined to the cover part 2 and rotates with the cover part 2 as one piece; and a left< >right pair of fixed portions 102, 103 formed on both sides of the moveable portion 101 and further fixed to the main body part 3 side.

The main body part 3 comprises a key input portion 8 and a microphone 10.

The key input portion 8 constitutes a cross key 81 for focus movement when using the menu display; a determination key 82 for making decisions; an address book key 83 for address book data access; a network connection key 84 for direction of a network connection; a movie playback key 85 for activating a movie playback mode; an E-mail key for activating an E-mail mode (receive, create, edit, transmit); an off-hook key 87; a clear key 88 (cancellation detection); a non-hook key 89 (all cleared: jump instruction in incoming wait status); a ten-keypad 810 for inputting a telephone number or alphanumeric literal notations, etc. Additionally, an image pickup lens 17 for recording and speakers 7R, 7L for sound, such as a ring tone, etc. are arranged in the back surface of the main body part 3.

A first magnetic sensor 28 and a second magnetic sensor 29 are arranged in the corner areas of the free end side and placed on the inner surface of the main body part 3. In more detail, as seen in FIG. 1B, the first magnetic sensor 28 is arranged in the location overlapping the first speaker 5 whenever the cover part 2 is in a folded position and at which point the main display portion 6 and the key input portion 8 form opposing surfaces. Accordingly, the first magnetic sensor 28 in this folded position detects the magnetism in a magnetic circuit path (magnetic field) produced by the first speaker 5 and existence of this magnetic detection is outputted. In other words, upon detection of magnetism by the first magnetic sensor 28 shown in FIG. 1B, this indicates the cover part 2 is in the closed position (closed style).

In addition, the second magnetic sensor 29 is arranged in the location directly under the first speaker 5 whenever the cover part 2 is first opened by rotation on the axis of the first hinge portion 100, then rotating the cover part 2 a complete 180° (180 degrees) on the axis of the second hinge portion 12 and once more closing the cover part 2 (FIG. 3C or 3D described later). Accordingly, the second magnetic sensor 28 in this folded position detects the magnetism in the magnetic circuit produced by the first speaker 5 and existence of this magnetic detection is outputted. In other words, upon detection of magnetism by the second magnetic sensor 29, this indicates the main display portion 6 is facing outward and the cover part 2 is in the closed position (view style). Furthermore, when neither the first magnetic sensor 28 nor the second magnetic sensor 29 detect magnetism, as seen in FIG. 1A or as described FIG. 3B, this indicates that the cover part 2 is in an opened position (opened style or reversed-opened style).

Furthermore, FIGS. 2A~2E are outline view diagrams showing the front surface and each side surface of the cellular telephone 1 with the cover in the closed position. FIG. 2A shows the cellular telephone 1 cover in the closed position (cover side). FIG. 2B shows a side surface observed from the "A" direction of FIG. 2A. FIG. 2C shows a side surface observed from the "B" direction of FIG. 2A. FIG. 2D shows a side surface observed from the "C" direction of FIG. 2A. FIG. 2E shows a side surface observed from the "D" direction of FIG. 2A.

The main body part 3 on one side direction comprises a first side key 90, a second side key 91 and a shutter key 92. The first side key 90 functions as a manners key in an idle status. The second side key 91 functions as a memo key. The shutter key 92 functions as a shutter key in a camera mode when the cover part 2 is in the closed position. Also, the main body part 3 on the opposite side direction comprises a cradle connector 32 and a memory card slot 33 (covered). The cradle connector 32 connects the cellular telephone 1 to a cradle sideways when placed in an install stand which doubles, namely, as a charging stand for charging the battery (not shown) with electrical power from the install stand. The memory card slot 33 can be supplied with recording media, for example, an SD card (Secure Digital flash memory card) or other computer-readable medium.

Next, FIGS. 3A~3D are mimetic diagrams showing use configurations as applied to the cellular telephone 1 according to the preferred embodiments. The cellular telephone 1 according to the preferred embodiments initially is as shown in FIG. 2A with the cover part 2 in the closed position (closed style). Upon opening the cover part 2, the arrangement (opened style) for the portrait display position of the main display portion 6 is as shown in FIG. 3A. From the position as shown in FIG. 3B, the cover part 2 arrangement (reversed-opened style) is rotated 180° on the rotational axis β via the second hinge portion 12 and further, the cover part 2 is rotated and folded on the rotational axis a via the movable portion 101 of the first hinge portion 100. Subsequently, the cellular telephone 1 is rotated in the direction of the arrows shown in FIG.

3C. In this manner, the arrangement (view style) for the landscape display position of the main display portion 6 is as shown in FIG. 3D.

Figure 4B:
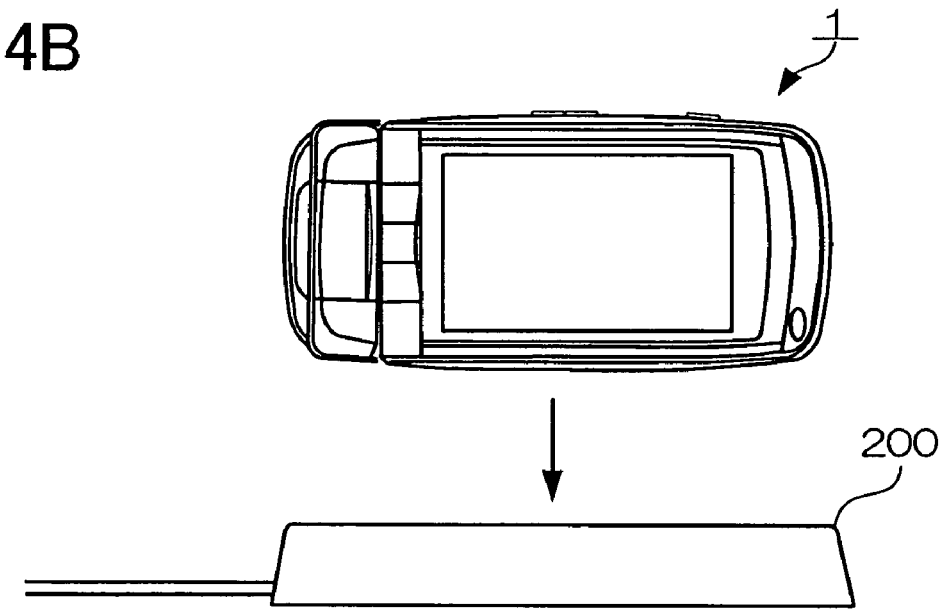
Figure 4C:
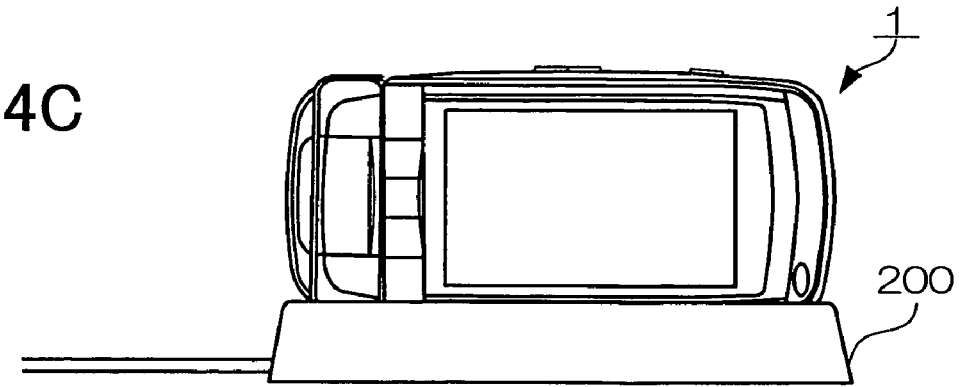

FIGS. 4A~4C are mimetic diagrams showing the process and position for placing the cellular telephone 1 in a charging stand (cradle) according to the preferred embodiments. As seen in FIG. 4A, a charging stand 200 for placing the cellular telephone 1 is equipped with a connector 201 and in a location which fits the cradle connector 32 exactly. As mentioned above in the arrangement (refer to FIG. 3D) for the landscape display position of the main display portion 6 of the cellular telephone 1 and as shown in FIG. 4B, when the cellular telephone 1 is placed in the charging stand 200, the cradle connector 32 and the connector 201 join together. Then, as shown in FIG. 4C, the cellular telephone 1 is supported in the landscape display position. At this stage, the cellular telephone detects being placed in the charging stand 200.

In the charging stand 200, the cellular telephone 1 may be placed in the arrangement position in which the main display portion 6 faces inward to the main body part 3 and the cover part 2 is in the closed position (closed style). Also, the cellular telephone 1 may be placed in the arrangement position in which the main display portion 6 faces outward and the cover part 2 is in the closed position (view style).

In the preferred embodiments, if the cellular telephone 1 is placed in the charging stand 200 in an incoming wait status or if a predetermined time that the device has been left unattended elapses, a slide show display is executed which sequentially switches and displays a plurality of images but only when in the arrangement position of namely, view style, in a folded position with the main display portion 6 facing outward.

Besides, in an incoming wait status, whether or not (autostart check flag) the slide show display is to be executed upon a predetermined time that the device has been left unattended or whether or not (charging stand check flag) the slide show display is to be executed when placed in the charging stand 200 can be suitably set by the user from a predetermined setting screen (not shown). Furthermore, in the above-mentioned view style, whether or not (slide show setting) a slide show display is to be executed for sequentially switching and displaying a plurality of images can be similarly set by the user. Incidentally, as stated earlier, the current style arrangement position of the cellular telephone 1 can be detected by the existence of magnetic detection by the first magnetic sensor 28 and the second magnetic sensor 29.

Figure 5:
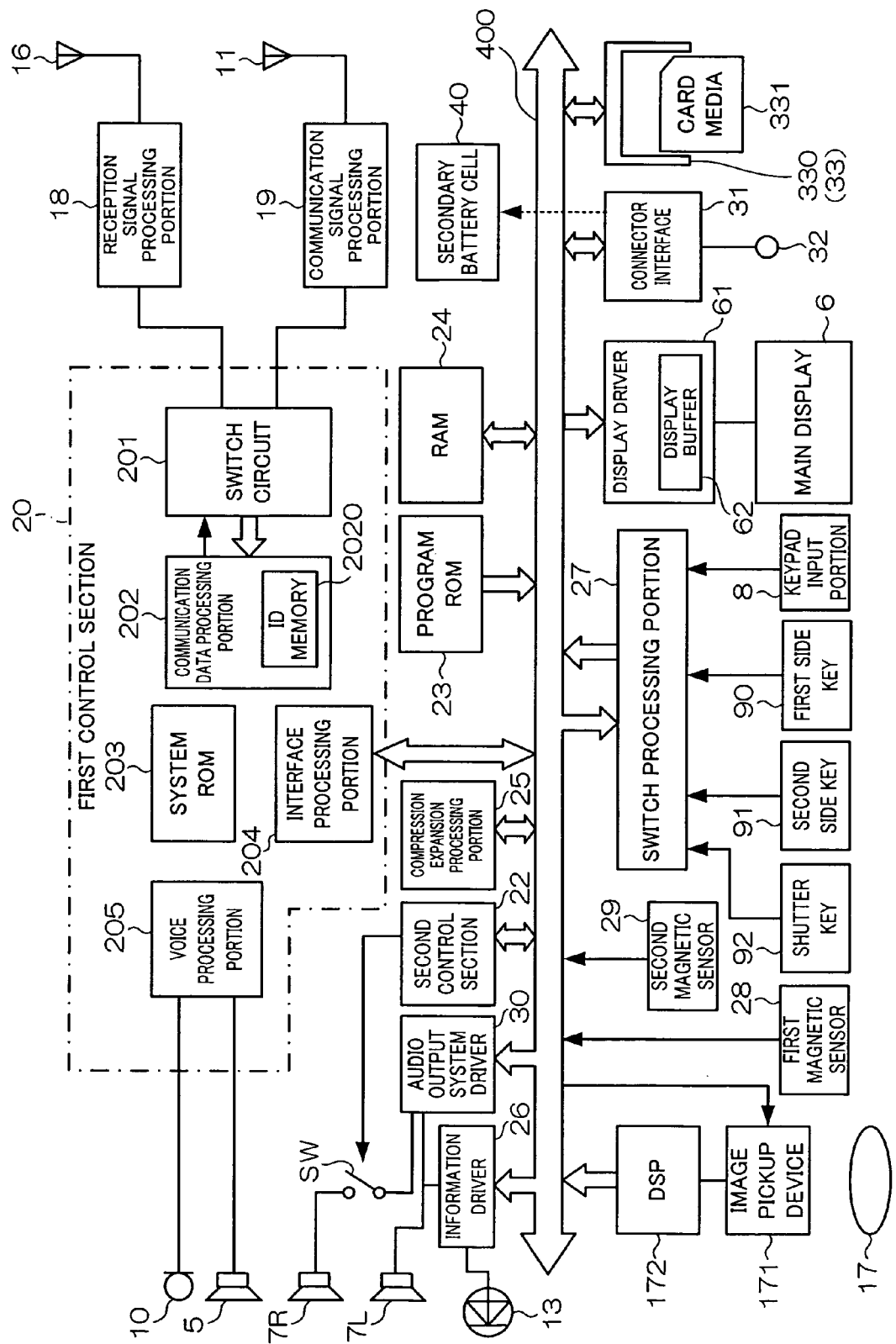
FIG. 5 is a block diagram showing the circuit composition of the cellular telephone 1 according to the preferred embodiments.
Figure 6:
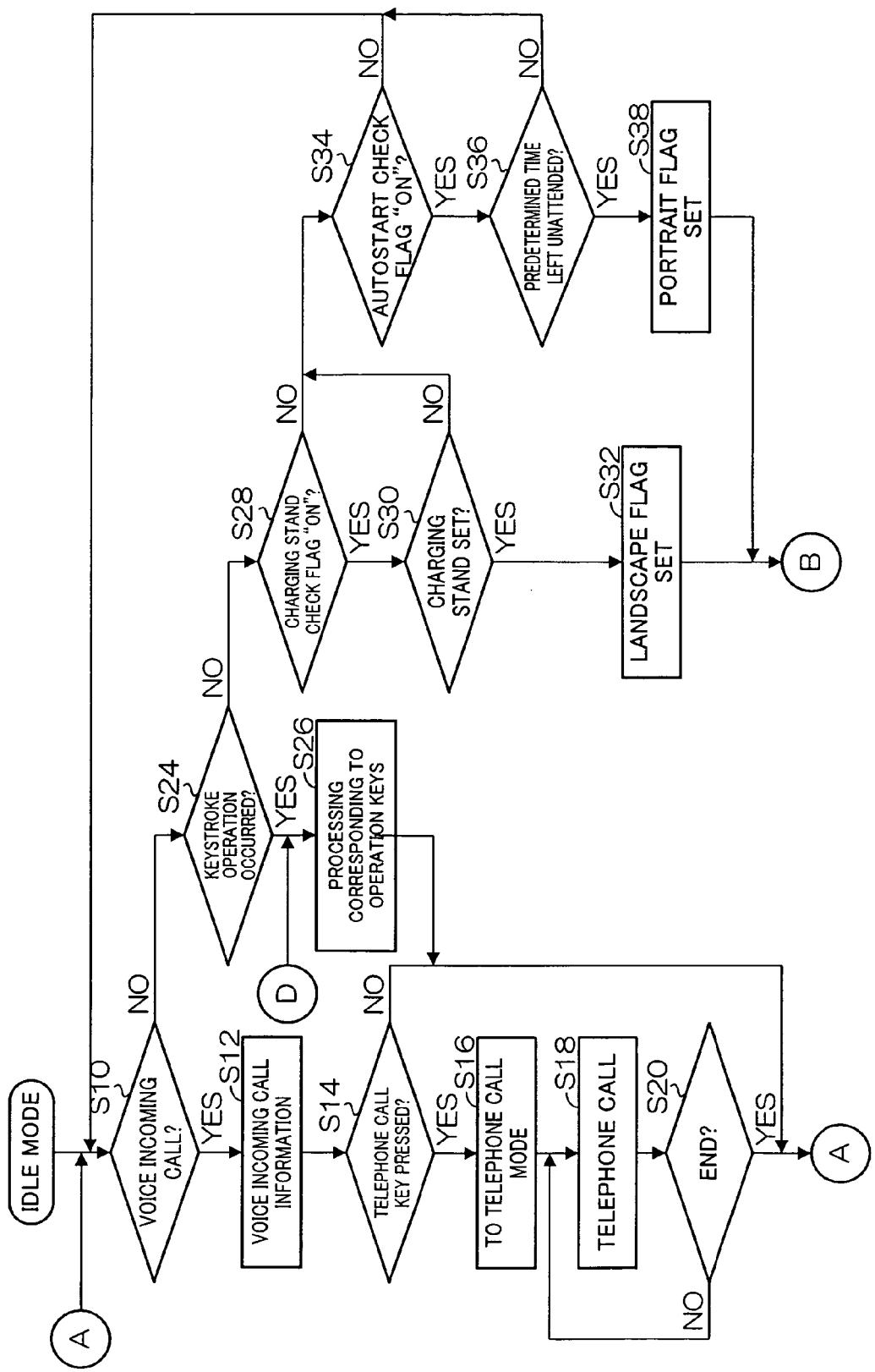
FIG. 6 is a flow chart for explaining operation of the cellular telephone 1 according to the preferred embodiments.
Figure 7:
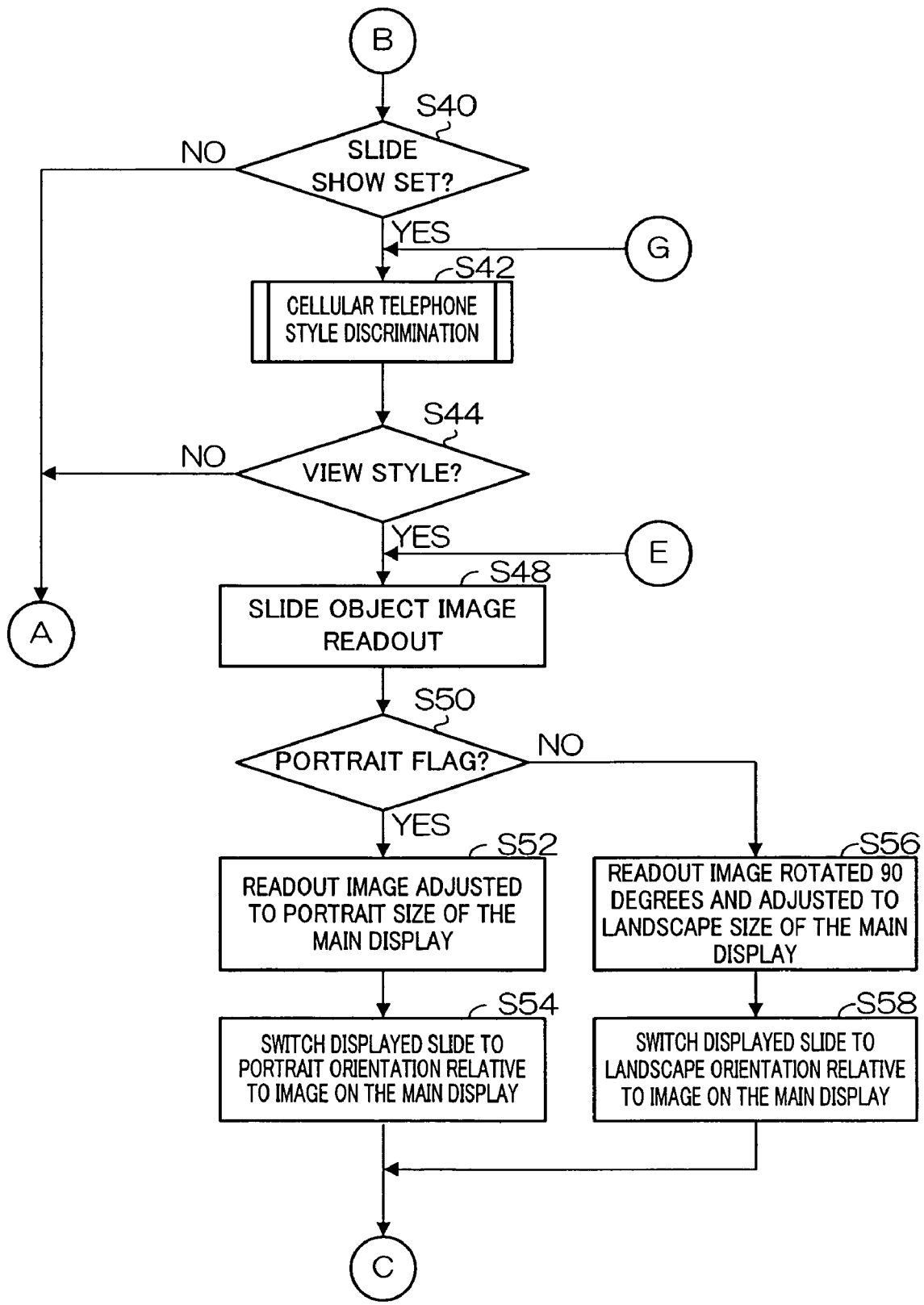
FIG. 7 is a flow chart for explaining operation of the cellular telephone 1 according to the preferred embodiments.
Figure 8:
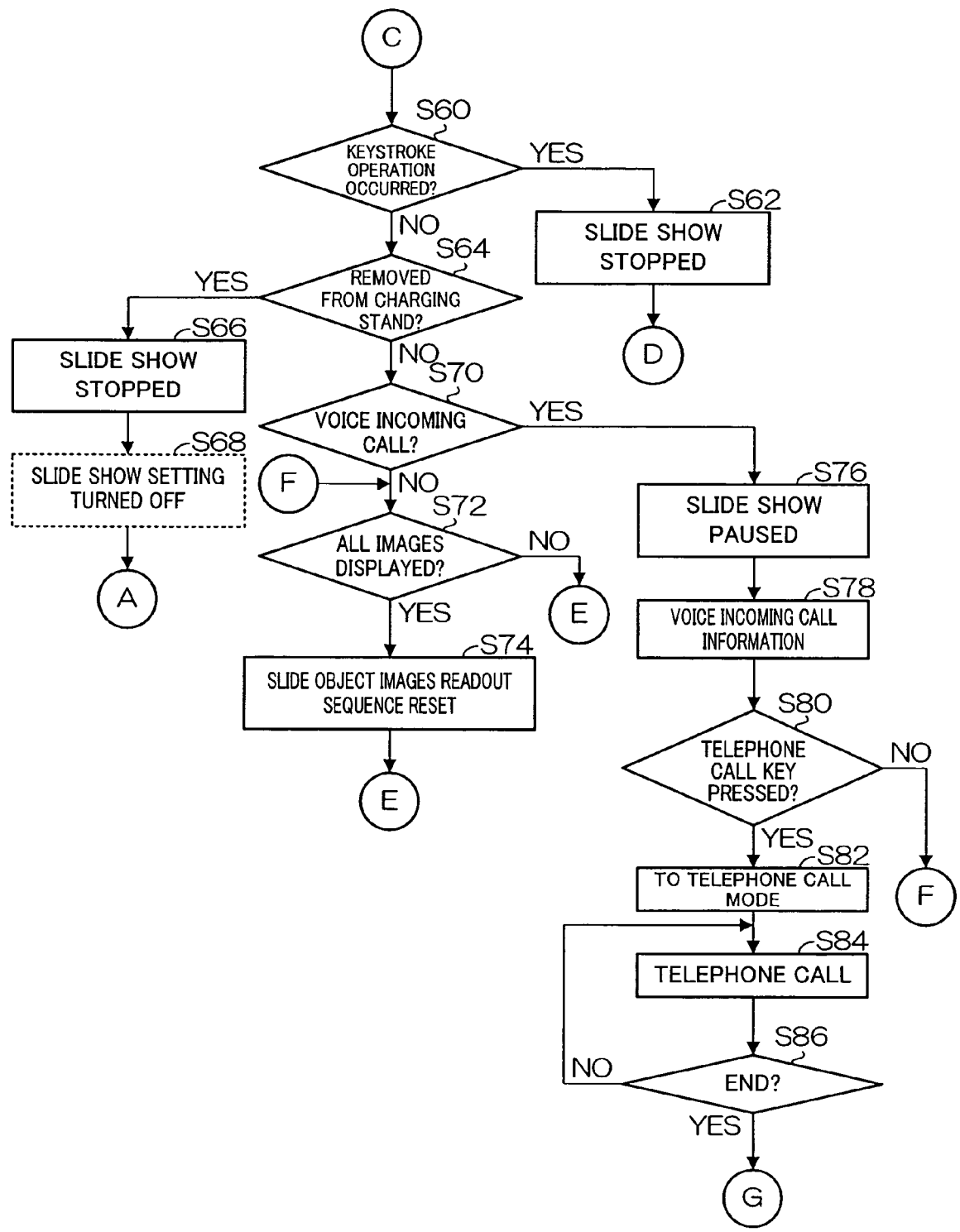
FIG. 8 is a flow chart for explaining operation of the cellular telephone 1 according to the preferred embodiments.

FIG. 5 is a block diagram showing the circuit composition of the cellular telephone 1 according to the preferred embodiments. When a reception signal processing portion 18 receives data communication mode initiation instructions from a switch circuit 201, negotiation (terminal authentication, line connection) with an external wireless base station will be commenced and a process which temporarily occupies the communication bandwidth is performed. Then, from a wireless signal received by a built-in antenna 16, the code modulated signal in machine code is extracted and outputted to a communication data processing portion 202 via the switch circuit 201.

A communication signal processing portion 19 is always supplied power in a data communication mode and also in an idle status. Also, code modulation of digital modulated signals (transmitted voice data, E-mail data and packet data including network connection information) from the communication data processing portion 202 are executed and outputted from a main antenna 11. Conversely, in transmissions by a wireless base station, the code modulated signal in machine code of a wireless signal received by the main antenna 11 is extracted and outputted to the communication data processing portion 202 via the switch circuit 201.

In addition, as for the built-in antenna 16 and the main antenna 11, when the cover part 2 is in a rotated position and also when in a closed position, there is an effective spatial relationship for performing space diversity reception.

A first control section 20 performs centralized connection control with information resources, such as a database, etc. connected via the network infrastructure, for example, a Communication Service Provider (CSP), the Internet, etc., relayed via a wireless base station and subsequent stages. Furthermore, in this embodiment, the cellular telephone 1 comprises two control sections with the first control section 20 controlling overall communication processing and in addition to this a second control section 22 performs the below mentioned regarding recording/processing, image processing and image playback processing.

The switch circuit 201 receives a control signal from the communication data processing portion 202 and supplies power to the reception signal processing portion 18 and the communication signal processing portion 19, as well as controls processing operation initiation and termination. In detail, when in a normal power supply "ON" state or a reception "ON" mode state, the operation supplies power to only the communication signal processing portion 19. On the other hand, when there is an indication of a data communication mode according to the user operating the network key connection 84 or a previously set schedule, the operation supplies power to the reception signal processing portion 18 and the communication signal processing portion 19.

The communication data processing portion 202 processes the code modulated signal based on a PSK (Phase Shift Keying) system method and/or decodes the digital signal based on a QAM (Quadrature Amplitude Modulation) system method which is received in the reception signal processing portion 18 and the communication signal processing portion 19. Concurrently, CELP (Code-Excited Linear Prediction) digitized voice data outputted by a voice processing portion 205 is modulated as a signal corresponding to a PSK system method and modulates in spread code.

Also, the ID memory 2020 in the communication data processing portion 202 is previously assigned in the cellular telephone 1 for storing characteristic data for wireless base stations, Communication Service Providers and Internet access. This data includes, for example, the service code assigned for each service provider, telephone numbers for calling out on the cellular telephone 1, manufacturer code of the cellular telephone 1, IP address for Internet access and E-mail addresses.

A system ROM 203 (Read-Only Memory) stores a control program for communication control.

As a characteristic feature of this preferred embodiment, the system ROM 203 stores an operation switchover control program for the reception signal processing portion 18 and communication signal processing portion 19 other than the usual communication negotiation program. Accordingly, when there is an indication of a data communication mode, space diversity reception is effected through the main antenna 11 and the built-in antenna 16 and temporarily the communication bandwidth is preempted. The program stores the code modulated signal which is received from both the reception signal processing portion 18 and the communication signal processing portion 19 which is almost simultaneously decoded and synthesized to a digital signal based on a QAM system method and output to a bus 400 via an interface processing portion 204.

The voice processing portion 205 comprises a CELP modulation/demodulation system and an MPEG (Moving Picture Experts Group) audio sound demodulation system and, in a telephone call state, outputs analog audio generated by the voice processing portion 205 from a first speaker 5. A switch SW controlled from a second control section 22 outputs an audio signal to both a second speaker 7R and a third speaker 7L in movie playback mode when there is stereo audio data contained in a movie file. The second speaker 7L is also driven with an information driver 26 which generates incoming call information sounds and an audio output system driver 30.

The second control section 22 performs control of movie files downloaded from the data communication mode in movie playback mode, still image/video playback display processing in camera mode and overall recording/processing in camera mode. Specifically, in the preferred embodiment, the second control section 22 performs display control of a slide show display which sequentially switches and displays recorded images while detecting the arrangement of the cellular telephone 1 (landscape display position=placed in the charging stand: view style). Also, in this embodiment, even though parallel processing with the above-mentioned first control section 20 is possible at the time of an incoming message interruption by a cellular telephone function, the interface processing portion 204 performs bus address/data interrupt processing accompanying these processes.

A program ROM 23 stores each processing program, for example, movie playback mode, camera mode, etc. A RAM 24 (Random Access Memory) memorizes various data required in data communication processing and voice communication, specifically, storage of an address book data composed of telephone numbers, E-mail addresses, recipient mailing addresses, etc., E-mail data sent and received by E-mail communication, images attached to an E-mail (still images, video), recorded images by the camera mode (still images, video), and multimedia files received through a network connection (illustrations, still images, video, audio, etc.). Also, the RAM 24 memorizes the status of an autostart check flag which indicates whether or not to execute a slide show when a predetermined time left unattended is set by the user and a charging stand check flag which indicates whether or not to execute a slide show when placed in the charging stand 200. Furthermore, the RAM 24 memorizes the status of whether or not to execute a slide show display for sequentially switching and displaying a plurality of images.

Next, a compression/expansion processing portion 25 performs compression processing of still images/video recorded in camera mode corresponding to MPEG-2, MPEG-4, as well as expansion processing of movie files downloaded with the data communication mode in movie playback mode and still images/video in camera mode.

The information driver 26 operates an information LED 13 (Light Emitting Diode) and the third speaker 7L for informing when incoming message processing is detected. A switch processing portion 27 outputs a control signal to the first control section 20 and the second control section 22 following operation detection from the key input portion 8, the first side key 90, the second side key 91 and the shutter key 92. The first magnetic sensor 28 and the second magnetic sensor 29 detect magnetism of the magnetic circuit (magnetic field) produced by the first speaker 5 mentioned above and supplies a detection signal to the second control section 22.

Additionally, the cellular telephone 1 comprises a image pickup device 171 composed of an image sensor, such as a CCD (Charge-Coupled Device), CMOS (Complementary Metal-Oxide Semiconductor), etc. and a step motor for optical zoom in the subsequent stage of the image pickup lens 17; and a DSP 172 (Digital Signal Processor) for converting the analog signal recorded by the image pickup device 171 into a digital signal and generating corresponding image data. Moreover, the effective pixel area of the image sensor in this preferred embodiment is fixed in a 4:3 aspect ratio.

When the cradle connector 32 is placed in the cradle, namely, the charging stand 200, for charging a secondary battery cell 40 with electrical power from the install stand, the cellular telephone 1 connects with the bus via a connector interface 31. A memory card slot 330 (33) is supplied with the recording card media 331, for example, an SD card. A display driver 61 performs display control of the display data temporarily stored in the display buffer 62 to the main display portion 6.

B. Operation of the Preferred Embodiments

Figure 9:
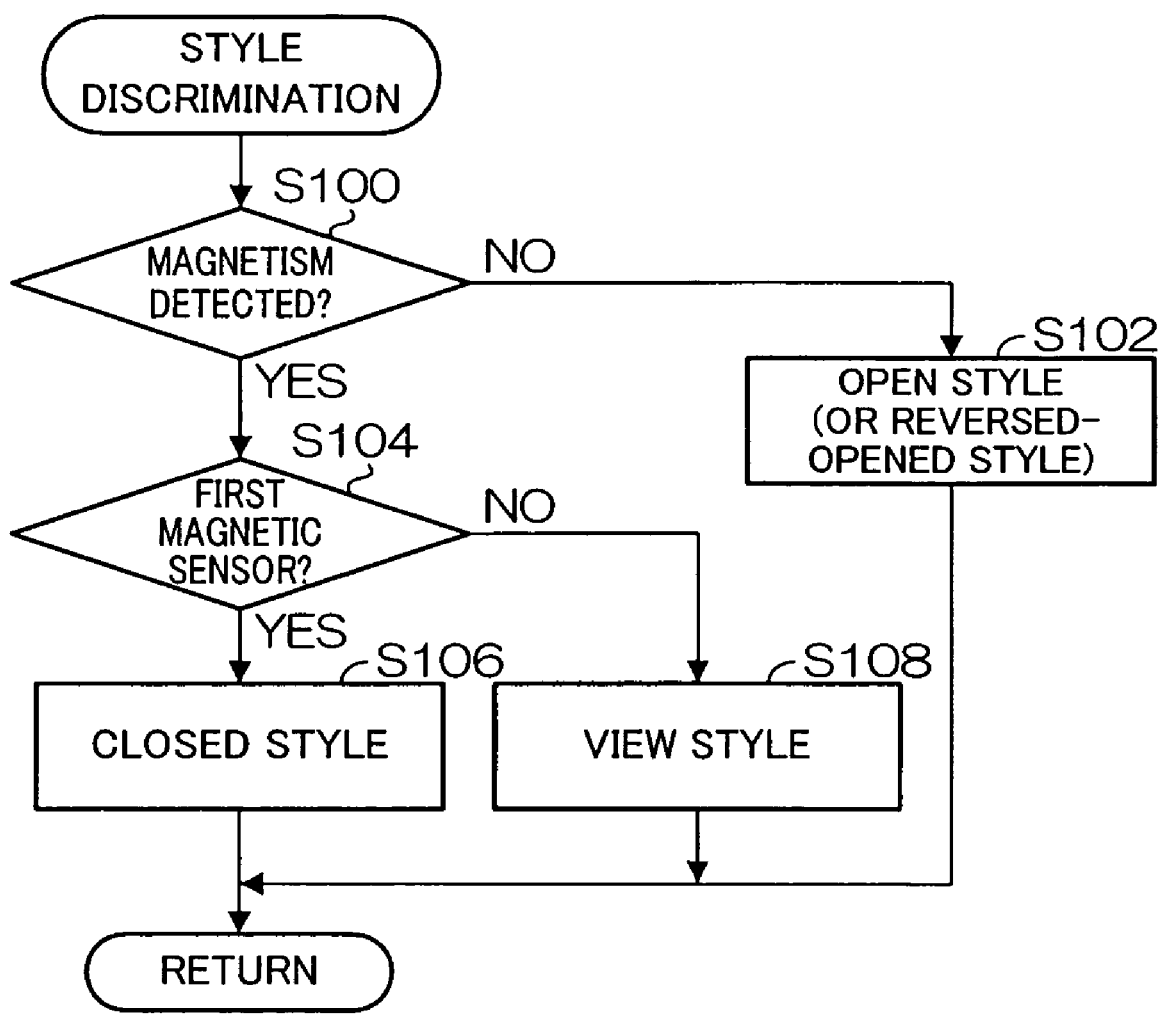
FIG. 9 is a flow chart for explaining operation of the cellular telephone 1 according to the preferred embodiments.
Figure 10A:
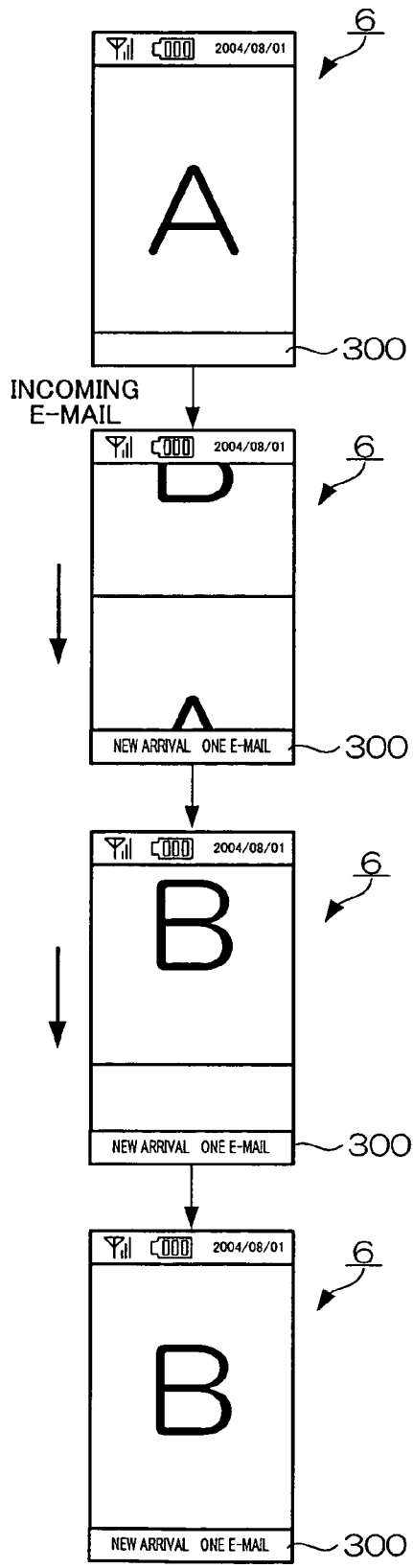
FIGS. 10A~10B are mimetic diagrams showing image display examples when the cellular telephone 1 is placed in a charging stand or upon detecting a predetermined time that the device has been left unattended and in the case of, namely, view style, in a folded position with the main display portion 6 facing outward.
Figure 10B:
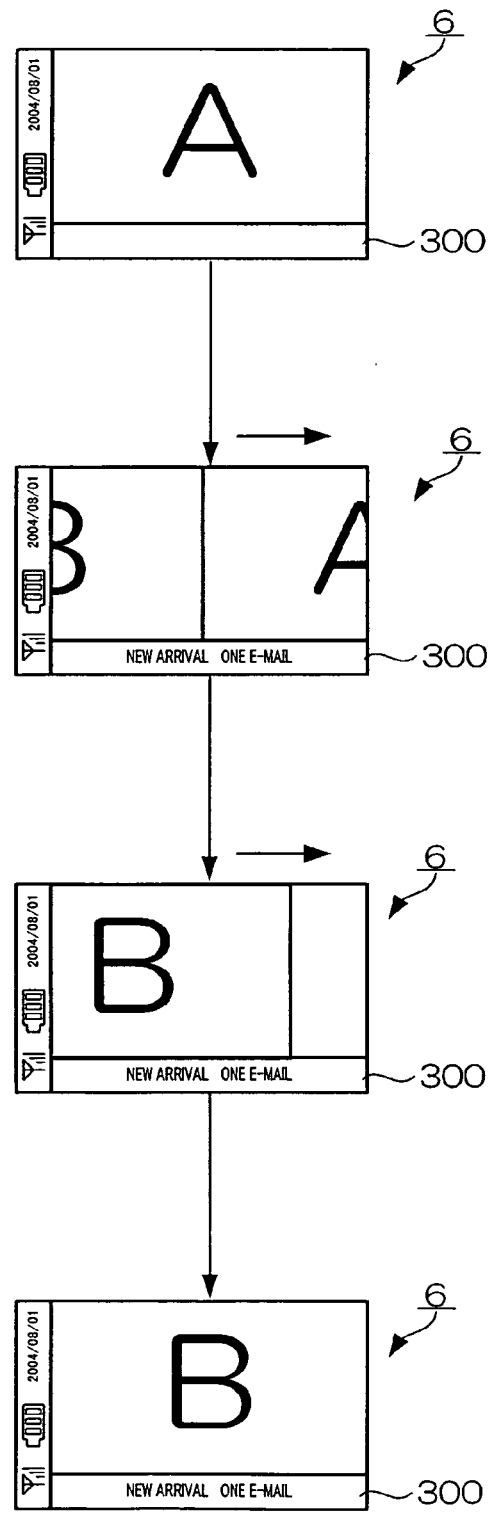

Next, operation of the preferred embodiments mentioned above will be explained. Here, FIGS. 6 thru 9 are flow charts for explaining operation of the cellular telephone 1 according to the preferred embodiments. Furthermore, FIG. 10A is a mimetic diagram showing image display examples when the cellular telephone 1 is placed in a charging stand 200 and in the case of the cover part 2 being in a closed position (landscape display position: view style) with the main display portion 6 facing outward. FIG. 10B is a mimetic diagram showing image display examples when the cellular telephone 1 performs operation at any predetermined time and in the case of the cover part 2 being in a closed position (portrait display position: view style) with the main display portion 6 facing outward.

Furthermore, in the following explanation, the autostart check flag and the charging stand check flag can be set as "ON" or "OFF" (default="ON") beforehand by the user. Also, the cellular telephone 1 can be similarly set beforehand by the user as to whether or not a slide show is to be executed for sequentially switching and displaying a plurality of images.

In the cellular telephone 1 during an idle mode, the operation judges whether or not there is any voice incoming call (Step S10). When there is voice incoming call information, the voice incoming call is reported through the third speaker 7L or the information LED 13 with the information driver 26 (Step S12). Next, the operation judges whether or not the telephone call talk key (off-hook key 87) has been pressed (Step S14) and if not pressed the operation reverts to Step S10.

On the other hand, when the talk key (off-hook key 87) has been pressed, the operation shifts to a talk mode for performing a voice telephone call (Step S16) and a voice telephone call is carried out (Step S18). During a telephone call, the operation judges whether or not the telephone call has been completed by the depressing of the on-hook key 89 (Step S20). When the telephone call has not been completed, the telephone call continues at Step 18. Conversely, when a telephone call is completed by the depressing of the on-hook key 89, the operation reverts to Step S10.

Next, when there is no voice incoming call, the operation judges whether or not any keystroke operation has occurred (Step S24). When any keystroke operation occurs, processing corresponding to the operated key is performed (Step S26). Then, the operation reverts to Step S10.

Moreover, when there is neither no voice incoming call nor keystroke operation, the operation judges whether or not a charging stand check flag is "ON" (Step S28). Then, when the charging stand check flag is "ON", the operation judges whether or not the cellular telephone 1 is placed in the charging stand 200 (Step S30). Subsequently, when not placed in the above-mentioned charging stand 200, the operation judges whether or not the autostart check flag is "ON" (Step S34). Then, when the autostart check flag is "ON", the cellular telephone 1 judges whether or not a predetermined time has elapsed that the device has been left unattended (Step S36).

Subsequently, in cases where the charging stand check flag and the autostart check flag are "OFF", if not placed in the charging stand 200 and if not a predetermined time that the cellular telephone 1 has been left unattended, the operation reverts to Step S10 and repeats execution of the above-mentioned processes.

Conversely, when the cellular telephone 1 is placed in the charging stand 200, a landscape flag is set (Step S32). This landscape flag referred to in subsequent processes is the flag indicating that the main display portion 6 is in the landscape display position, namely, the cellular telephone 1 arrangement position (either the closed style or view style) when placed in the charging stand 200. Additionally, when the cellular telephone 1 predetermined time left unattended elapses, a portrait flag is set (Step S38). This portrait flag referred to in subsequent processes is the flag indicating that the main display portion 6 is in the portrait display position, namely, the cellular telephone 1 arrangement position (either the closed style or view style) when not placed in the charging stand 200.

Next, the operation judges whether or not the slide show display is set (Step S40). Then, when the slide show display is not set and regardless of whether or not in view style, the operation reverts to Step S10 and repeats execution of the above-mentioned processes. On the other hand, when the slide display show is set, subsequently the cellular telephone 1 style is discriminated (Step S42).

Here, the style discrimination operation will be explained with reference to the flow chart shown in FIG. 9. In style discrimination, initially, the operation judges whether or not magnetism is detected by either of the first magnetic sensor 28 or the second magnetic sensor 29 (Step S100). Then, when magnetism is not detected from either of the magnetic sensors 28 or 29, the operation discriminates that the cellular telephone 1 style is in the opened style (refer to FIG. 1A) or the reversed-opened style (refer to FIG. 3B).

Conversely, when magnetism is detected from either of the first magnetic sensor 29 or the second magnetic sensor 29, the operation judges whether or not the magnetism detected is in the first magnetic sensor 28 (Step S104). Then, in the case where magnetism is detected in the first magnetic sensor 28, the operation discriminates that the cellular telephone 1 is in the closed style (refer to FIG. 1B) (Step S106). On the other hand, when magnetism is not detected in the first magnetic sensor 28 and in the case where magnetism is detected in the second magnetic sensor 29, the operation discriminates that the cellular telephone 1 is in the view style (refer to FIGS. 3C and 3D) (Step S108).

By the style discrimination processing mentioned above, when the cellular telephone 1 style is determined, subsequently, the operation judges whether or not the cellular telephone 1 is the view style (Step S44). Then, in cases where the cellular telephone 1 is other than the view style, the operation reverts to Step S10 and repeats execution of the above-mentioned processes. Accordingly, if the cellular telephone 1 is set in the charging stand 200 or if a predetermined time that the device has been left unattended elapses, whenever the cellular telephone 1 is not in the view style as shown in FIGS. 3C and 3D the slide show display will not be executed.

On the other hand, when the cellular telephone 1 is in the view style, slide object images are readout (Step S48). Here, the slide object images includes recorded images memorized (saved) in the RAM 24, images attached to E-mails, images downloaded, etc. In addition, the user may select slide object images beforehand from among saved images.

Next, the operation judges whether or not the portrait flag is set (Step S50). When the portrait flag is set at Step S38 mentioned above, namely, the main display portion 6 is the view style in the portrait display position as seen in FIG. 3C, the readout images are adjusted to the portrait size of the main display portion 6 (Step S52). Then, as shown in FIG. 10A, a slide switching display is performed to a portrait orientation relative to the images (Step S54). Specifically, in this case as shown in FIG. 10A, a plurality of images are sequentially switched and displayed (slide show display). In this manner, while an already displayed image "A" slides downward, the following image "B" slides downward from the upper side. When the portrait flag is set, the operation advances to the next Step S64.

Conversely, when the portrait flag is not set and in the case where the landscape flag is set at Step S32 mentioned above, namely, the cellular telephone 1 is placed in the charging stand 200 and the main display portion 6 is in the landscape display position as shown in FIG. 3D and FIG. 4C, the readout images are rotated 90° and adjusted to the landscape size of the main display portion 6 (Step S56). Then, as seen in FIG. 10B, a slide switching display (right to left or left to right) is performed to a landscape orientation relative to the images (Step S58). Specifically, in this case as shown in FIG. 10B, a plurality of images are sequentially switched and displayed (slide show display). In this manner, while an already displayed image "A" slides to the right side, the following image "B" slides sideways from the left side. In cases where the portrait flag is not set, subsequently, during the slide show display which sequentially switches and displays a plurality of the above-mentioned images, the operation judges whether or not any keystroke operation has occurred during the slide show display for sequentially switching and displaying a plurality of the above-mentioned images (Step S60). When any keystroke operation occurs, the slide show display is stopped (Step S62) and reverts to Step S26 shown in FIG. 6. After processing corresponding to the operated key is performed, the operation reverts to Step S10 and repeats execution of the above-mentioned processes.

Next, the operation judges whether or not the cellular telephone 1 has been removed from the charging stand 200 (Step S64. When the cellular telephone 1 has been removed from the charging stand 200 during a slide show display, the slide show display is stopped (Step S66) and the operation reverts to Step S10 shown in FIG. 6 and repeats execution of the above-mentioned processes. On the other hand, when the cellular telephone 1 has not been removed from the charging stand 200 the operation advances to the next Step S64.

In addition, when removed from the charging stand 200 during a slide show display, the user may carry the cellular telephone 1 as it is in the view style. In this case, while the cellular telephone 1 is carried in the view style, the slide show display is restarted when a predetermined time left unattended elapses. Therefore, when removed from the charging stand 200 during a slide show display, the slide show display setting can be automatically turned "OFF" (Step S68). Also, it is also possible to cause the cellular telephone 1 to inform the user by a message, icon, etc. that the slide show setting is being turned "OFF."

On the other hand, when there is no keystroke operation, the operation judges whether or not there is any voice incoming call (Step S70). When there is no voice incoming call, the operation judges whether or not all the images which constitute the slide objects have been displayed (Step S72). When all the images have not been displayed, the operation reverts to Step S48. As mentioned above, the next slide object images are readout and operations subsequent to performing the slide switching display are repeated.

Then, when all the images have been displayed, the slide object images readout sequence is reset (returns to beginning) (Step S74) and reverts to Step S48. As mentioned above, the next slide object images are readout and operations subsequent to performing the slide switching display are repeated.

On the other hand, when there is a voice call incoming during a slide show display, the slide show display is paused (Step S76) and the voice incoming call is reported through the third speaker 7L or the information LED 13 with the information driver 26 (Step S78). Next, the operation judges whether or not the telephone call talk key (off-hook key 87) has been pressed (Step S80) and if not pressed the operation reverts to Step S72 and the slide show display is continued.

On the other hand, when the talk key (off-hook key 87) has been pressed, the operation shifts to a talk mode for performing a voice telephone call (Step S82) and a voice telephone call is carried out (Step S84). During a telephone call, the operation judges whether or not the telephone call has been completed by the depressing of the on-hook key 89 (Step S86). When the telephone call has not been completed, the telephone call continues at Step S84. Conversely, when a telephone call is completed by the depressing of the on-hook key 89, the operation reverts to Step S42 and the style of the cellular telephone 1 is discriminated again. Because the cellular telephone 1 is used in an opened style during a telephone call, the operation reverts to Step S42 for reconfirming the cellular telephone 1 style after completion of a telephone call. Depending on the situation, the cellular telephone 1 may be arranged in the closed style or again arranged in the view style.

Then, when the cellular telephone 1 is restored to the view style, the processes after Step s48 are executed and the slide show display is continued. However, in this case the slide show display will revert to the beginning of the initiated image sequence. When the user wants to continue a slide show display from the image before a telephone call commences, a marker can be temporarily applied to that image and memorized as the image just before a telephone call commences.

According to the preferred embodiments mentioned above, if the cellular telephone 1 is placed in the charging stand 200 or if a predetermined time that the device has been left unattended elapses, the slide show display for sequentially switching and displaying a plurality of images in the main display portion 6 is executed but only in the case of, namely, view style, in a folded position with the main display portion 6 facing outward. As a direct result, the slide show display can be executed in the most suitable arrangement position and the slide show display can be prevented from being unnecessarily executed in an arrangement position unsuitable for a slide show display.

Additionally, when executing the slide show display, the cellular telephone 1 can be configured in the most suitable arrangement position for viewing by adjusting the image size corresponding to the direction (portrait display position, landscape display position) of the main display portion 6. Furthermore, the cellular telephone 1 can be configured in the most suitable arrangement position for viewing by changing the slide direction corresponding to the direction (portrait display position, landscape display position) of the main display portion 6.

Finally, in the preferred embodiments mentioned above, even though the embodiment examples are applied to a cellular telephone, the present invention is not restricted to this. The present invention may be applied to a multimedia terminal, etc. having a function which at least displays images.

While the present invention has been described with reference to the preferred embodiments, it is intended that the invention be not limited by any of the details of the description therein but includes all the embodiments which fall within the scope of the appended claims.

What is claimed is:

1. A portable information processing device, comprising:
a first housing part having a key input portion; and
a second housing part having a main display portion, the first housing part and the second housing part being movably joined together to any one of a plurality of arrangement positions;
an image display means for display processing of an image on the main display portion;
a placement detection means for detecting whether or not the device has been placed in an external device;
a setting discrimination means for discriminating whether or not an automatic display setting of said image exists when the placement detection means detects that the device has been placed in the external device;
a position discrimination means for discriminating whether or not an arrangement position of the first housing part and second housing part is in a display arrangement position such that the main display portion faces outward; and
a display control means for initiating startup of display processing of said image by the image display means when the setting discrimination means discriminates that the automatic display setting exists and the position discrimination means discriminates that the arrangement position of the first housing part and second housing part is in the display arrangement position;
wherein said display control means performs display processing in a mode different from said display processing of said image by said image display means on a condition of not being placed in the external device when detected as having been placed in the external device by said placement detection means and starting display processing of said image by said image display means.

2. The portable information processing device according to claim 1, wherein the device comprises a communication function;
wherein said display control means performs discrimination with said setting discrimination means and discrimination with said position discrimination means to control display processing of said image according to the results whenever said communication function is in a wait status for an incoming arrival.

3. The portable information processing device according to claim 1, wherein said display control means displays said image in a different display direction from an image display direction upon controlling display processing of said image on a condition of not being placed in said external device when detected as having been placed in said external device by said placement detection means and controlling display processing of said image.

4. The portable information processing device according to claim 1, wherein said image display means has a display process which sequentially switches and displays a plurality of images; and said display control means moves and switches display of said images in a different moving direction from an image moving direction upon controlling display processing of said images on a condition of not being placed in said external device when detected as having been placed in said external device by said placement detection means and controlling display processing of said images.

5. A computer-readable medium encoded with a computer program executed by a processor of a portable information processing device including a first housing part having a key input portion and a second housing part having a main display portion, which are movably joined together to any one of a plurality of arrangement positions, comprising:

program code for performing display processing of an image on the main display portion;

program code for detecting whether or not the device has been placed in an external device;

program code for discriminating whether or not an automatic display setting of the image exists when the device is detected to have been placed in the external device;

program code for discriminating whether or not an arrangement position of the first housing part and second housing part is in a display arrangement position such that the main display portion faces outward; and program code for starting display processing of said image when the automatic display setting is discriminated as existing and the arrangement position of the first housing part and second housing part is discriminated as being in the display arrangement position;

wherein said program code for starting display processing comprises program code for performing display processing in a mode different from said display processing of said image by said program code for performing display processing on a condition of not being placed in the external device when detected as having been placed in the external device by said program code for detecting whether or not the device has been placed in an external device and starting display processing of said image by said program code for performing display processing.

* * * * *